United States Patent
Takahashi et al.

(10) Patent No.: US 8,883,358 B2
(45) Date of Patent: Nov. 11, 2014

(54) METAL AIR SECONDARY BATTERY

(75) Inventors: Shin Takahashi, Mito (JP); Kazuhiro Yoshida, Narita (JP); Kazushige Kohno, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 75 days.

(21) Appl. No.: 13/807,028

(22) PCT Filed: Jul. 2, 2010

(86) PCT No.: PCT/JP2010/004347
§ 371 (c)(1),
(2), (4) Date: Dec. 27, 2012

(87) PCT Pub. No.: WO2012/001745
PCT Pub. Date: Jan. 5, 2012

(65) Prior Publication Data
US 2013/0101907 A1    Apr. 25, 2013

(51) Int. Cl.
*H01M 12/08* (2006.01)
*H01M 4/90* (2006.01)
*H01M 10/052* (2010.01)
*H01M 4/38* (2006.01)
*H01M 4/86* (2006.01)

(52) U.S. Cl.
CPC ............ *H01M 12/08* (2013.01); *H01M 4/9016* (2013.01); *H01M 10/052* (2013.01); *H01M 4/382* (2013.01); *H01M 4/8668* (2013.01); *H01M 4/8615* (2013.01); *H01M 4/8647* (2013.01); *H01M 4/90* (2013.01); *Y02E 60/50* (2013.01); *Y02T 10/7011* (2013.01); *H01M 2004/8689* (2013.01)
USPC ........................................................ 429/405

(58) Field of Classification Search
USPC .......................................................... 429/405
See application file for complete search history.

(56) References Cited

U.S. PATENT DOCUMENTS

| | | | |
|---|---|---|---|
| 2007/0054168 A1* | 3/2007 | Chang et al. | 429/27 |
| 2007/0128495 A1* | 6/2007 | Bobowick | 429/35 |

(Continued)

FOREIGN PATENT DOCUMENTS

| | | | |
|---|---|---|---|
| JP | 2002-158013 A | 5/2002 | |
| JP | 2008-198590 A | 8/2008 | |

(Continued)

OTHER PUBLICATIONS

IPDL Machine Translation of the Detailed Description of JP 2010-103064A (May 2010).*

(Continued)

*Primary Examiner* — Gregg Cantelmo
(74) *Attorney, Agent, or Firm* — Volpe and Koenig, P.C.

(57) ABSTRACT

An object of the invention is to reduce the charging overvoltage by using a positive electrode member which does not contain a carbon material that causes the generation of lithium carbonate ($Li_2CO_3$), and which comprises a metal porous material, thereby suppressing the formation of lithium carbonate ($Li_2CO_3$). The metal air secondary battery of the invention is characterized by having a negative electrode member which has metal ions occluded therein and emits metal ions, a positive electrode member which ionizes oxygen, and a separator which is impregnated with an electrolyte and disposed between the negative electrode member and the positive electrode member, wherein the carbon weight in the total weight of a carrier, a catalyst, and a binder constituting the positive electrode member is 50% or less.

7 Claims, 3 Drawing Sheets

(56) References Cited

U.S. PATENT DOCUMENTS

| | | | |
|---|---|---|---|
| 2008/0160413 A1* | 7/2008 | Dopp et al. | 429/223 |
| 2010/0033138 A1* | 2/2010 | Alger et al. | 320/153 |
| 2010/0086849 A1* | 4/2010 | Mizuno et al. | 429/209 |
| 2010/0266901 A1* | 10/2010 | Johnson | 429/231.8 |
| 2011/0195320 A1 | 8/2011 | Nishikoori et al. | |

FOREIGN PATENT DOCUMENTS

| | | |
|---|---|---|
| JP | 2009-080937 A | 4/2009 |
| JP | 2009-093983 A | 4/2009 |
| JP | 2009-211912 A | 9/2009 |
| JP | 2009-252638 A | 10/2009 |
| JP | 2010-103064 A | 5/2010 |
| JP | 2010-177036 A | 8/2010 |
| WO | 2010/082338 A1 | 7/2010 |

OTHER PUBLICATIONS

Ogasawara et al., "Rechargeable Li2O2 Electrode for Lithium Batteries", Journal of the American Chemical Society, vol. 128, No. 4, pp. 1390-1393, 2006.

* cited by examiner

FIG. 1

1: POSITIVE ELECTRODE MEMBER  2: SEPARATOR  3: LITHIUM METAL  4: O-RING
5: PRESS PLATE  6: CURRENT COLLECTING PLATE  7: CLAMPING SPRING
8: OXYGEN GAS VALVE

FIG. 2

1 POSITIVE ELECTRODE MEMBER = 1a BASE MATERIAL + 1b CARRIER + 1c CATALYST + 1d BINDER

FIG. 3

11: METAL POROUS MATERIAL   12: PORE   13: METAL OXIDE CATALYST

METAL AIR SECONDARY BATTERY

TECHNICAL FIELD

The present invention relates to a metal air battery using oxygen as a positive electrode active material, and more particularly to a rechargeable metal air secondary battery.

BACKGROUND ART

In recent years, there is a growing trend toward protection of the environment and savings of energy resources, and, in the automobile industry, there has been fierce competition of the development of a hybrid electric vehicle (HEV) using both gasoline and a motor driven by electricity and an electric vehicle (EV) driven only by a motor, instead of the development of a conventional automobile using gasoline as a fuel.

The performance of the electric vehicle heavily depends on the characteristics of the storage battery used as a source for supplying electric energy to the vehicle, and therefore battery manufacturers in cooperation with the respective electric vehicle manufacturers are competing fiercely for the development of a lithium-ion secondary battery.

The lithium-ion secondary battery has a feature such that it is light-weight and exhibits high output, and hence is the most promising storage battery for use in electric vehicle.

However, with respect to the weight energy density of the lithium-ion secondary battery, the theoretical upper limit is considered to be about 400 Wh/kg, and the actually achieved weight energy density is as small as about 100 Wh/kg.

It is said that for widely spreading the electric vehicle, the electric vehicle requires a weight energy density of about 500 Wh/kg, and the development of an innovative battery expected to have a weight energy density larger than that of the lithium-ion secondary battery, which is the storage battery currently mainly studied and developed, is desired.

One of the causes of restricting the weight energy density of the lithium-ion secondary battery is a positive electrode material formed from a lithium-containing transition metal oxide, such as lithium cobalt oxide. The transition metal element as an element constituting the positive electrode material is a heavy metal, and a storage battery having the transition metal incorporated thereinto is increased in weight, so that the storage battery is reduced in weight energy density.

For removing this disadvantage, a metal air battery utilizing oxygen in air as a positive electrode material and a metal as a negative electrode material has attracted attention.

Further, when the metal air battery is used in electric power storage, it is expected that the weight reduction due to the use of the metal air battery can reduce the cost, and therefore the metal air battery is thought to be promising.

Like the lithium-ion battery, the metal air battery is needed to be increased in the number of lamination, area, and capacity for surely achieving the practical output.

With respect to the metal air battery, only a metal air primary battery has been practically used, for example, representatively, a metal air battery using zinc is used as a power source for a hearing aid, and a rechargeable metal air secondary battery has not yet been put into practical use.

For example, PTL 1 discloses a lithium air battery having a construction using as a catalyst a composite oxide having an alkali metal or an alkaline earth metal, a transition metal, and oxygen.

RELATED ART REFERENCES

Patent Literature

PTL 1: JP-A-2009-252638

Non-Patent Literature

NPL 1: Takeshi Ogasawara et al, "Rechargeable Li2O2 Electrode for Lithium Batteries", Journal of the American Chemical Society 2006, 128, 1390-1393.

SUMMARY OF INVENTION

Technical Problem

A main reason that it is difficult to obtain a metal air secondary battery resides in that the overvoltage during the charging is large.

For example, in PTL 1, the charging voltage is as high as 4.3 V. Further, NPL 1 reports that the theoretical open circuit voltage is 2.96 V and the discharge potential is 2.5 to 2.7 V, but the charge potential is high and the charging overvoltage is high.

In the above related art, the charging voltage is merely shown, and there is no description about the cause of the generation of charging overvoltage and the method for solving the problem.

An object of the invention is to reduce the metal air secondary battery in charging overvoltage, which has not conventionally been attempted.

Solution to Problem

A metal air secondary battery according to an embodiment of the invention has a negative electrode member which has occluded therein metal ions serving as a negative electrode active material and emits metal ions, a positive electrode member which ionizes oxygen serving as a positive electrode active material, i.e., a positive electrode member, and a separator which is impregnated with an electrolyte or an electrolytic solution and disposed between the negative electrode member and the positive electrode member (positive electrode member).

Further, the construction is characterized in that the positive electrode member is a metal porous material having a carbon weight ratio of at least 50% or less, wherein the metal porous material has a metal oxide catalyst supported thereon.

The method for producing the metal porous material is not limited, and a metal porous material knitted from metal fibers, an expanded material, a metal porous material obtained by calcining metal powder, or the like can be used. However, it is desired that the catalyst is easily supported on the metal porous material and oxygen easily diffuses through the metal porous material, and, with respect to the pore diameter and porosity of the metal porous material, it is necessary to select appropriate ranges.

Specifically, the invention has a construction such that the positive electrode member comprises a metal porous material as a material having a carbon weight ratio of at least 50% or less, wherein the metal porous material has a metal oxide catalyst supported thereon, and therefore the discharge product can be prevented from changing in properties due to carbon, so that the charging overvoltage can be reduced.

In the metal air secondary battery, the following discharge reactions:

(Negative electrode side) $2Li \rightarrow 2Li^+ + 2e^-$     (1)

(Positive electrode side) $O_2 + 2Li^+ + 2e^- \rightarrow Li_2O_2$     (2)

(Total reaction) $2Li + O_2 \rightarrow Li_2O_2$     (3), and the following charge reactions:

(Negative electrode side) $2Li \leftarrow 2Li^+ + 2e^-$     (4)

(Positive electrode side) $O_2 + 2Li^+ + 2e^- \leftarrow Li_2O_2$     (5)

(Total reaction) $2Li + O_2 \leftarrow Li_2O_2$     (6)

are generally known.

As a cause of the increase of the charging overvoltage in the above reactions, the following phenomenon is considered.

Specifically, in the conventional positive electrode member, a carbon material is contained as a conductive material or a catalyst carrier, and the carbon material is reacted with lithium oxide ($Li_2O$) or lithium peroxide ($Li_2O_2$) formed in the discharge reaction to form lithium carbonate ($Li_2CO_3$). The thus formed lithium carbonate ($Li_2CO_3$) must be decomposed during the charge reaction, and such a decomposition of lithium carbonate is considered to increase the charging overvoltage.

In the invention, the positive electrode member does not contain a carbon material which causes the generation of lithium carbonate ($Li_2CO_3$), but comprises a metal porous material, and therefore the formation of lithium carbonate ($Li_2CO_3$) is suppressed, thus reducing the charging overvoltage.

With respect to the material for the metal porous material used in the metal air secondary battery of the present embodiment, Ni, Al, Cu, Ti, SUS, or the like is preferably used, and especially preferred is Ni or Al.

With respect to the metal porous material, preferred is a metal porous material knitted from metal fibers, an expanded material, a metal porous material obtained by calcining metal powder, or the like, and, particularly, from the viewpoint of the method for producing the metal porous material, it is preferred to use metal fibers or powder.

Taking the dispersion of the catalyst into consideration, the metal porous material preferably has a specific surface area of 0.03 m$^2$/g or more.

The metal porous material desirably has a porosity of 30% or more from the viewpoint of the diffusion of oxygen and the storage of the discharge product, and preferably has a porosity of 980 or less from the viewpoint of supporting the catalyst.

The metal porous material preferably has a pore diameter of 10 nm or more from the viewpoint of the diffusion of oxygen and the storage of the discharge product, and the upper limit of the pore diameter is preferably in the range that satisfies the above-mentioned specific surface area and porosity of the metal porous material.

It is preferred that the metal porous material has a metal oxide catalyst supported thereon.

With respect to the metal oxide catalyst, an oxide of Mn, Si, Cu, Sn, Ti, V, Mo, Nb, Ag, or the like is preferred, and especially preferred is $MnO_2$ or $SiO_2$.

In the metal air secondary battery of the present embodiment, it is preferred that a metal which supplies the metal ions is lithium, sodium, calcium, magnesium, or zinc. Particularly, an organic electrolytic solution can be used, and especially preferred is lithium such that the discharging voltage is as high as 2.0 to 2.5 V and the battery can be used at about 3 V.

Lithium used in the negative electrode may be in the form of an alloy of lithium with another metal or may contain a carbon material, but pure lithium is preferred from the viewpoint of the increase of the energy density.

Further, in the invention, the problem about carbon contained in the positive electrode member is to be solved, and therefore, in an air battery using a metal, such as sodium, calcium, magnesium, or zinc, the invention is effective when using carbon, and further a water-soluble electrolytic solution of the above metal can be used.

Advantage of the Invention

By the invention, the metal air secondary battery can be reduced in charging overvoltage.

DESCRIPTION OF EMBODIMENTS

In the present embodiment, a metal air battery is described in which the positive electrode member comprises a metal porous material and a metal oxide catalyst, and the carbon material weight ratio in the positive electrode member is at least 50% or less, and thus the discharge product is prevented from changing to lithium carbonate due to the carbon material, so that the charging overvoltage is reduced.

A metal porous material, which functions as a conductive agent or/and a catalyst carrier and a gas diffuser, is used in the positive electrode member. When the carbon weight ratio in the positive electrode member is 50% or less, the discharge product can be prevented from changing to lithium carbonate.

With respect to the material for the metal porous material used in the metal air secondary battery of the present embodiment, Ni, Al, Cu, Ti, SUS, or the like is preferably used, and especially preferred is Ni, Al, or Cu.

Further, from the viewpoint of achieving excellent dispersion of the catalyst, the metal porous material desirably has a specific surface area of 0.03 m$^2$/g or more.

The metal porous material preferably has a pore diameter of 10 nm to 450 μm. When the pores are too small, the diffusion of oxygen through the metal porous material becomes poor, so that there is a possibility that the performance is lowered, and, when the pores are too large, the catalyst cannot be effectively supported on the metal porous material.

The metal porous material preferably has a porosity of 30 to 98%. When the porosity is too small, the discharge product ($Li_2O_2$) is very likely to be deposited in the pores of the positive electrode member to inhibit the battery reaction, and, when the porosity is too large, the catalyst cannot be effectively supported on the metal porous material.

It is preferred that the metal porous material has a metal oxide catalyst supported thereon.

With respect to the metal oxide catalyst, an oxide of Mn, Si, Cu, Sn, Ti, V, Mo, Nb, Ag, or the like is preferred, and especially preferred is $MnO_2$ or $SiO_2$.

With respect to the method for supporting the metal oxide catalyst, there is no particular limitation, but, from the viewpoint of facilitating the preparation of the catalyst, preferred is a method in which the catalyst is dispersed in a solvent and the metal porous material is impregnated with the resultant dispersion, followed by drying, or a method in which metal powder and the catalyst are bound together using a binder mixed thereinto.

Further, the invention is a method of solving the problem of the oxidation of carbon, and can be used in a metal air secondary battery using a metal other than lithium and using carbon.

With respect to the electrolytic solution used in the present embodiment, a non-aqueous electrolytic solution generally used in a lithium-ion secondary battery and the like can be used.

For example, at least one solvent selected from propylene carbonate, ethylene carbonate, butylene carbonate, vinylene carbonate, γ-butyrolactone, dimethyl carbonate, diethyl carbonate, methylethyl carbonate, 1,2-dimethoxyethane, 2-methyltetrahydrofuran, dimethyl sulfoxide, 1,3-dioxolane, formamide, dimethylformamide, methyl propionate, ethyl propionate, phosphoric acid triester, trimethoxymethane, dioxolane, diethyl ether, sulfolane, 3-methyl-2-oxazolidinone, tetrahydrofuran, 1,2-diethoxyethane, chloroethylene carbonate, and chloropropylene carbonate can be used.

Desirably, it is preferred to use a high boiling-point cyclic compound.

Further, a solid electrolyte maintained in a polymer of ethylene oxide, acrylonitrile, vinylidene fluoride, methyl methacrylate, hexafluoropropylene, or the like, or an ionic liquid may be used instead of the non-aqueous electrolytic solution.

An alkaline aqueous solution used in an aqueous metal air secondary battery can be used.

With respect to the electrolyte used in the present embodiment, an electrolyte generally used in a lithium-ion secondary battery and the like can be used.

For example, a lithium salt having a chemical formula: $LiPF_6$, $LiBF_4$, $LiClO_4$, $LiCF_3SO_3$, $LiCF_3CO_2$, $LiAsF_6$, $LiSbF_6$, or LiTFSI, or a lithium imide salt, such as lithium trifluoromethanesulfonimide, can be used.

A gel electrolyte having a polymer of ethylene oxide, acrylonitrile, vinylidene fluoride, methyl methacrylate, hexafluoropropylene, or the like impregnated with a non-aqueous electrolytic solution may be used.

With respect to the binder used in the present embodiment, a binder generally used in a lithium-ion secondary battery and the like can be used.

For example, a fluororein, such as polyvinylidene fluoride (PVDF) or polytetrafluoroethylene (PTFE), or a styrene-butadiene rubber (SBR) can be used.

With respect to the separator used in the present embodiment, a separator generally used in a lithium-ion secondary battery and the like can be used.

For example, a porous separator of polyethylene, polypropylene, or the like, a glass ceramic having metal ionic conductivity, or the like can be used.

With respect to the form of the cell used in the present embodiment, any form may be employed as long as the reaction of the metal air secondary battery can be confirmed, and the form of the cell may be any of a laminated form, a cylindrical form, and the like. The present embodiment does not depend on the form of the cell.

Example 1

Hereinbelow, Examples in the present embodiment will be described with reference to the accompanying drawings and tables.

All the catalysts used in the Examples are crystalline metal oxides.

[Construction of Invention Example A]

Figure 1:
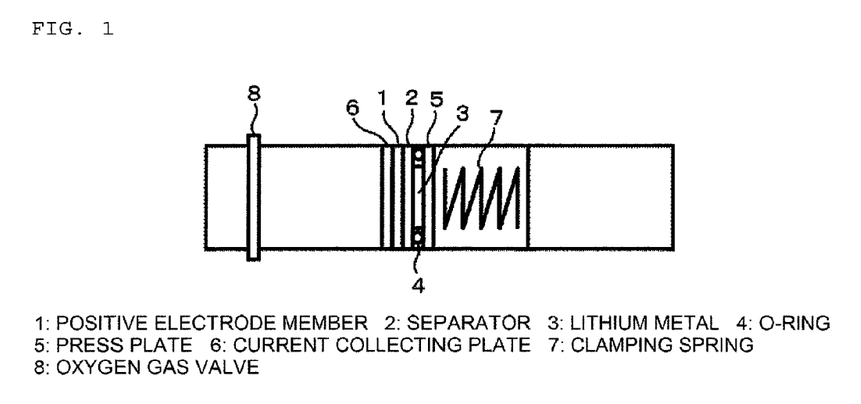
FIG. 1 is a cross-sectional view of the metal air secondary battery in the present Example.

FIG. 1 shows a cross-sectional view of the metal air secondary battery in the present Example.

In the present Example, a lithium air secondary battery of the Swagelok cell shown in FIG. 1 was prepared. FIG. 1 shows a diagrammatic view of the Swagelok cell.

In the present Example, a lithium air secondary battery using metal lithium as a negative electrode member and using a non-aqueous solvent in an electrolytic solution is described.

A cell was assembled in a glove box.

Figure 2:
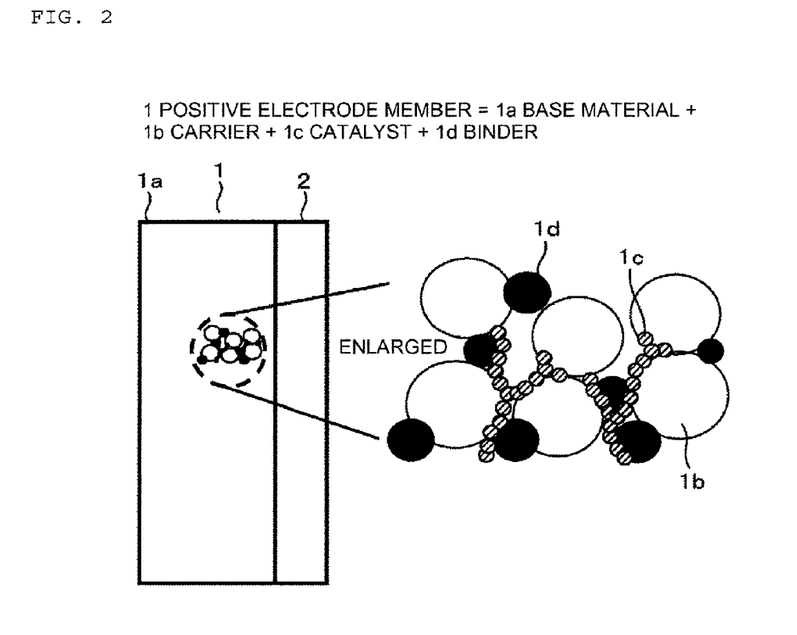
FIG. 2 is a diagrammatic view showing the construction of the positive electrode member in the present Example.

An enlarged view of the positive electrode member 1 shown in FIG. 1, which ionizes oxygen, is shown in FIG. 2.

The positive electrode member 1 comprises a 1a base material, a b carrier, a 1c catalyst, and a 1d binder. The 1a base material is a member having a function as a base material which has applied thereonto the 1c catalyst generally in a powdery form so as to form an electrode, the 1b carrier is a member having a function of having the 1c catalyst supported thereon, the 1c catalyst is a member having a function of ionizing oxygen, and the 1d binder is a member having a function of binding the 1a, 1b, and 1c together.

Figure 3:
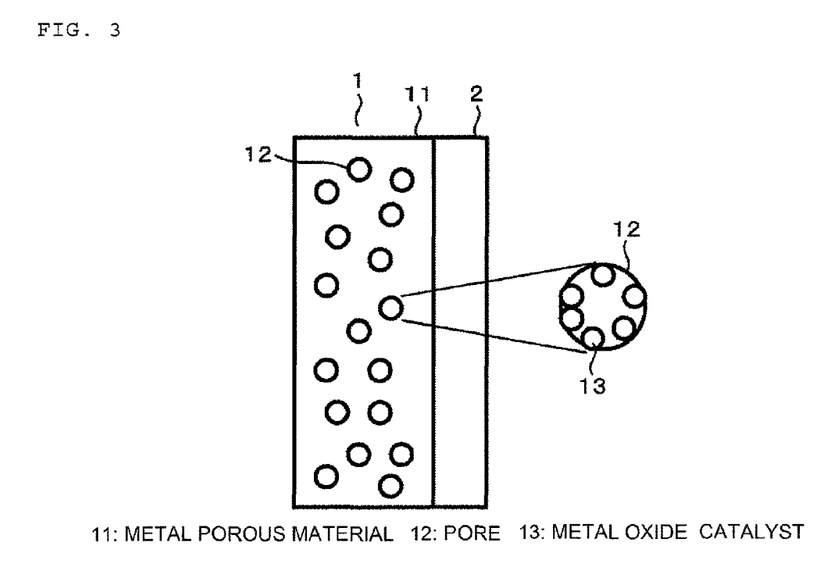
FIG. 3 is a diagrammatic view showing the enlarged construction of the positive electrode member in the present. Example.

The construction A of the Invention Example shown in Table 1 is first described below. As shown in FIGS. 2 and 3, the positive electrode member 1 comprises a 1a base material, a metal porous material 11 functioning both as a 1b carrier and a current collector 6, pores 12 present in the metal porous material 11, and a metal oxide 13 as a 1c catalyst supported around the pores.

TABLE 1

Constructions of Invention Examples and Comparative Example and efficiencies
(Charge/discharge conditions: 2 V-4 V, 0.1 mA/cm$^2$; F: 0.05 mA/cm$^2$)

| | Construction | 1a Base material | 1b Carrier | 1c Catalyst | 1d Binder | (mg) 1c Catalyst weight | Weight ratio | Efficiency (%) (1 Cy charge/1 Cy discharge) | Efficiency (%) (2 Cy charge/2 Cy discharge) | Efficiency (%) (3 Cy charge/3 Cy discharge) |
|---|---|---|---|---|---|---|---|---|---|---|
| Invention Example | A | Ni Felt | Ni Felt (serves also as 1a) | $MnO_2$ | PVDF | 1.44 | $MnO_2$/PVdF = 4/1 | 66.17 | 66.78 | 71.93 |
| Invention Example | B | Ni Felt | Ni Felt (serves also as 1a) | $SiO_2$ | PVDF | 1.28 | $SiO_2$/PVdF = 4/1 | 31.97 | 80.05 | 92.80 |

TABLE 1-continued

Constructions of Invention Examples and Comparative Example and efficiencies
(Charge/discharge conditions: 2 V-4 V, 0.1 mA/cm$^2$; F: 0.05 mA/cm$^2$)

| | Construction | 1a Base material | 1b Carrier | 1c Catalyst | 1d Binder | (mg) 1c Catalyst weight | Weight ratio | Efficiency (%) (1 Cy charge/1 Cy discharge) | Efficiency (%) (2 Cy charge/2 Cy discharge) | Efficiency (%) (3 Cy charge/3 Cy discharge) |
|---|---|---|---|---|---|---|---|---|---|---|
| Invention Example | C | Ni Porous | Ni Porous (serves also as 1a) | MnO$_2$ | PVDF | 1.7 | MnO$_2$/PVdF = 4/1 | 49.47 | 54.89 | 58.51 |
| Invention Example | D | Carbon paper | Ketjen black (KB) | MnO$_2$ | PVDF | 2 | KB/MnO$_2$/PVdF = 5/4/1 (Carbon weight ratio: 50%) | 56.85 | 60.67 | 65.20 |
| Invention Example | E | Ni Felt | Ni Felt (serves also as 1a) | MnO$_2$ | — | 20 | MnO$_2$ only | About 100% (up to 3.5 V) | — | — |
| Comparative Example | F | Carbon paper | Ketjen black (KB) | MnO$_2$ | PTFE | 0.35 | KB/MnO$_2$/PTFE = 10/2/5 (Carbon weight ratio: 59%) | 26.80 | — | — |

With respect to the metal porous material 11, an Ni felt knitted from Ni fibers as a metal material containing no carbon was used. The Ni felt having a porosity of 90% and a pore diameter of about 50 μm was used, and a cell having a thickness of 1 mm and a diameter of 12 mm was assembled.

Manganese dioxide (MnO$_2$) as the metal oxide catalyst 13 and PVdF as the binder were mixed together so that the MnO$_2$/PVdF weight ratio became 4/1 and the catalyst weight became about 2 mg, and the resultant mixture was applied to the metal porous material, followed by drying. The manganese dioxide functions as a catalyst for ionizing oxygen and, consequently, the positive electrode member 1 has the ability to ionize oxygen.

Further, the positive electrode member 1 and a lithium metal 3, which is the negative electrode member having metal ions occluded therein and emitting metal ions (lithium ions in the present Example), are insulated by a separator 2.

A circle cut out of the lithium metal 3 having a diameter of 8 mm and a thickness of 1 mm is used. The electrode area is defined as an area of the lithium metal. The electrode area was 0.5 mm$^2$.

A circle cut out of the separator 2 made of polyethylene having a diameter of 14 mm is used.

The sizes of the separator 2, positive electrode member 1, and lithium metal 3 are set as mentioned above. The reason for this is that the sizes set to be reduced in the order of the separator, positive electrode member, and negative electrode member are considered advantageous.

Several drops of an electrolytic solution are applied to the surface of the lithium metal 3 and the surface of the positive electrode member 1 so that the separator 2 is impregnated with the electrolytic solution.

With respect to the electrolytic solution, propylene carbonate containing 1 M (mole) of LiPF$_6$ as an electrolyte is used.

Further, as shown in FIG. 1, a current collector 6 comprising a stainless steel (SUS) mesh having a thickness of 1 mm is disposed. When the 1a base material is the metal porous material in the invention having an electron conduction property and a gas diffusion property, the base material is capable of serving as the current collector 6.

An O-ring 4 is disposed around the lithium metal 3, and a press plate 5 made of stainless steel (SUS) is put onto the lithium metal 3 and the O-ring 4 and a clamping spring 7 is placed so that the lithium metal 3, O-ring 4, and press plate 5 are in close contact with one another.

Thus, a structure in which the lithium metal 3, separator 2, and positive electrode member 1 are in close contact with one another is obtained.

Then, oxygen gas (99.9%) was allowed to flow from the outside of the current collector 6 into the cell at a flow rate of 500 ml/minute. Oxygen gas was allowed to flow for about 10 to 15 minutes, and an oxygen gas valve 8 provided in the cell was closed to fill the cell with oxygen gas.

The prepared cell is placed in a desiccator having terminals, and the desiccator is filled with argon gas. The outer terminal of the desiccator is attached to an apparatus for charge/discharge evaluation, and charge/discharge evaluation is conducted with respect to the cell.

Charge/discharge conditions are such that the electrode area is 0.5 cm$^2$, discharging is conducted at CC of 0.1 mA/cm$^2$ so that the cut-off voltage becomes 2.0 V, and charging is conducted at CC of 0.1 mA/cm$^2$ so that the cut-off voltage becomes 4.0 V.

[Construction of Invention Example B]

A construction is substantially the same as the construction A except that the catalyst is changed to SiO$_2$.

[Construction of Invention Example C]

The Ni metal porous material used in the construction A was changed, and MnO$_2$ used in the construction A was used as a catalyst. Physical properties of the Ni metal porous materials respectively used in the construction of the Invention Example A and the construction of the Invention Example C are summarized in Table 2.

As seen from Table 2 below, in the Invention A, the specific surface area is large and the pore diameter is small. A metal porous material in a felt form knitted from fibers is A, and a porous material obtained by expanding a metal is C.

TABLE 2

Comparison of physical properties of the metal porous materials

| | Construction | Both as 1a base material and 1b carrier | Specific surface area (m$^2$/g) | Porosity (%) | Pore diameter (μm) |
|---|---|---|---|---|---|
| Invention Example | A | Ni Felt | 0.134 | 90 | 50 |
| Invention Example | C | Ni Porous | 0.03 | 98 | 450 |

[Construction of Invention Example D]

In this construction, a carbon material, ketjen black (abbreviation: KB), is selected as the 1b carrier, $MnO_2$ is selected as the is catalyst, and PVdF is selected as the 1d binder, and a slurry obtained by mixing them together so that the carbon material weight ratio becomes 50% is applied to carbon paper as the 1a base material. The carbon material weight ratio is a value defined by the following formula.

Carbon material weight ratio (%)=(Weight of the carbon material in the 1b carrier)/(Weight of the 1b carrier+Weight of the 1c catalyst+Weight of the 1d binder)×100

[Construction of Invention Example E]

Figure 5:
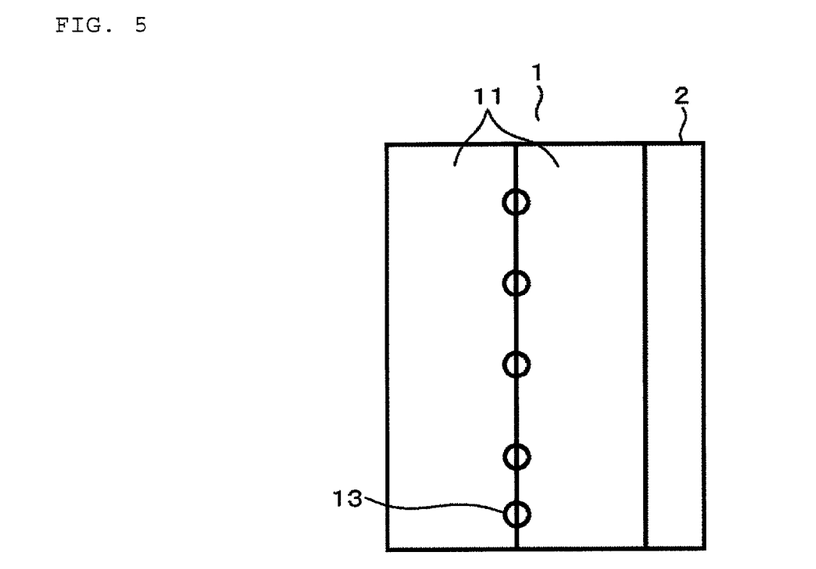
FIG. 5 is a diagrammatic view showing the construction E in the present Example.

A construction was formed as shown in FIG. 5 such that two sheets of the Ni metal porous materials (thickness: 1 mm; diameter: 12 mm) used in the construction A were prepared, and a particulate catalyst $MnO_2$ was disposed directly between the Ni metal porous materials without using a binder.

[Construction of Comparative Example F]

In this construction, a carbon material, ketjen black (abbreviation: KB), is selected as the 1b carrier, $MnO_2$ is selected as the 1c catalyst, and PTFE is selected as the 1d binder, and a slurry obtained by mixing them together so that the carbon material weight ratio becomes 59%, which is more than 50%, is applied to carbon paper as the 1a base material.

With respect to each of the above constructions, a charge/discharge cycle test was conducted.

Figure 4:
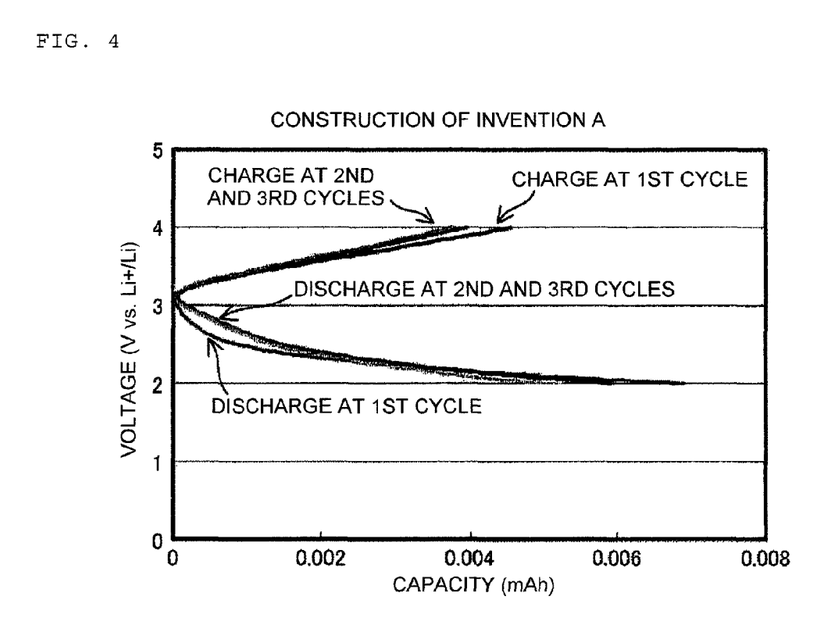
FIG. 4 is a diagram showing the characteristics of the metal air secondary battery of the invention and the Comparative Example containing a carbon material.

FIG. 4 shows the charge/discharge cycle characteristics in the Invention Example A. Table 1 shows the (charge capacity at the x-th cycle)/(discharge capacity at the x-th cycle) (X=1, 2, and 3) (unit: %) in the charge/discharge cycle with respect to each of the constructions A to F.

This efficiency indicates the discharge capacity at a discharging voltage of up to 2 V and the charge capacity at a charging voltage of up to 4 V, and therefore a large value of the efficiency means that the charging overvoltage is small so that the discharge product is more decomposed.

As can be seen from Table 1, when the positive electrode member 1 comprising the metal porous material and metal oxide in each of the constructions A, B, C, and E containing no carbon material is used, the efficiency in each cycle is higher than the efficiency obtained when using the positive electrode member 1 containing a carbon material in a weight ratio of more than 50% (Comparative Example F). These results have showed that the charging overvoltage can be reduced.

Preferably, as seen in Invention Example D, the effect of the invention can be obtained when the carbon weight ratio is up to 50%, and therefore the positive electrode member having a carbon weight ratio of 50% or less may be preferably used.

Further, when the metal porous material contains no carbon material and is chemically stable, the effect of the invention can be obtained, and therefore Ni, Al, Cu, Ti, SUS, or the like can be used.

The positive electrode member is capable of serving as the current collecting plate 6, and, in such a case, the number of parts for the battery can be preferably reduced. From this point of view, Ni, Al, Cu, or the like having a low resistance is preferred as a metal.

Further, as can be seen from the comparison between the Invention A and the Invention Example C, by using a metal porous material having a large specific surface area, the effect of the invention can be exhibited. Therefore, the metal porous material preferably has a specific surface area of at least 0.03 $m^2/g$ or more.

The effect of the invention can be obtained when any metal oxide catalyst is used as long as it has the ability to reduce oxygen/generate oxygen. Particularly, as seen in the Invention Example A, $MnO_2$ is preferred, but, as seen in the Invention Example B, the effect can be exhibited even when using $SiO_2$.

Figure 6:
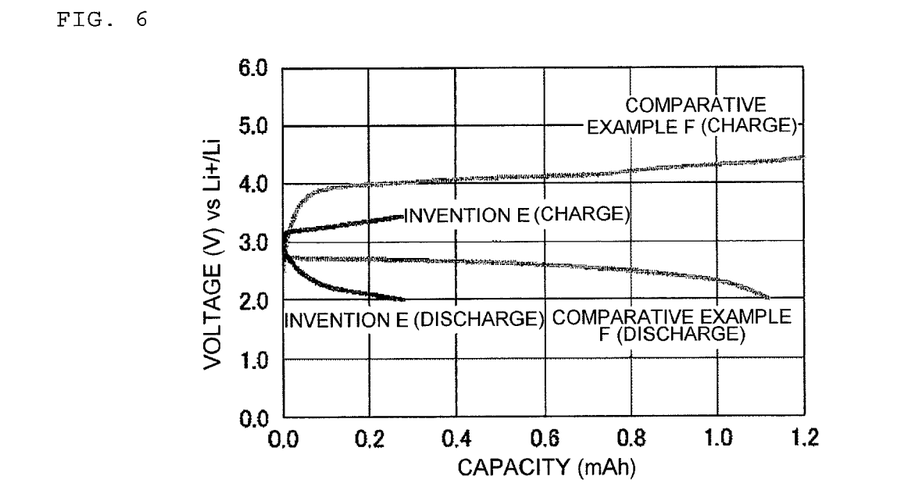
FIG. 6 is a diagram showing the charge/discharge cycle characteristics of the construction E in the invention and the Comparative Example F.

Further, FIG. 6 shows the charge/discharge cycle characteristics of the construction E in which the weight of $MnO_2$ is 20 mg, which is about 10 times the weight of $MnO_2$ used in the Invention Example A, and the Comparative Example F.

As seen from FIG. 6, in the construction containing no carbon material, the charging overvoltage is reduced. 1000 charging is possible particularly at a voltage as low as 3.5 V or less.

In the present Example, the increase of the overvoltage during the charging, which makes it difficult to obtain a metal air secondary battery, can be suppressed, and the metal air secondary battery shown in the present Example has excellent cycle characteristics and is considered to be increased in the catalyst life.

INDUSTRIAL APPLICABILITY

The invention relates to a metal air secondary battery, which can be applied to a hybrid electric vehicle (HEV) and an electric vehicle (EV), and further applied to a power source for electric power storage.

REFERENCE SIGN LIST

1: Positive electrode member
1a: Base material
1b: Carrier
1c: Catalyst
1d: Binder
2: Separator
3: Lithium metal
4: O-Ring
5: Press plate
6: Current collecting plate
7: Clamping spring
8: Oxygen gas valve
11: Metal porous material
12: Pore
13: Metal oxide catalyst

The invention claimed is:

1. A lithium air secondary battery having a negative electrode member which has metal ions occluded therein and emits metal ions, a positive electrode member which ionizes oxygen, and a separator which is impregnated with an electrolyte and disposed between the negative electrode member and the positive electrode member, the lithium air secondary battery being characterized in that the positive electrode member comprises at least a base material, a carrier, a catalyst, and a binder, wherein the catalyst is a metal oxide catalyst, the positive electrode member further includes a current collector and a metal porous material which is a nickel (Ni) felt functioning both as the carrier and the current collector, the Ni felt has a specific surface area of 0.03 $m^2/g$ or more and a pore diameter of 10 nm to 450 μm, and the carbon material weight ratio represented by the following formula in the positive electrode member is 50% or less:

Carbon material weight ratio (%)=(Weight of the carbon material contained in the carrier)/(Weight of the carrier+Weight of the catalyst+Weight of the binder)×100.

2. The lithium air secondary battery according to claim 1, wherein the metal porous material has a metal oxide supported around pores present in the metal porous material.

3. The lithium air secondary battery according to claim 1, wherein the metal porous material has a porosity of 30 to 98%.

4. The lithium air secondary battery according to claim 1, wherein the catalyst supported is an oxide of Mn, Si, Cu, Sn, Ti, V, Mo, Nb, or Ag.

5. The lithium air secondary battery according to claim 1, wherein the base material and the carrier are the same member.

6. The lithium air secondary battery according to claim 1, which has a current collector being in contact with the positive electrode member, wherein the base material, the carrier, and the current collector are the same member.

7. The lithium air secondary battery according to claim 1, wherein the charging voltage is 3.5 V or less.

\* \* \* \* \*